(12) United States Patent
Autio et al.

(10) Patent No.: US 10,156,880 B2
(45) Date of Patent: Dec. 18, 2018

(54) PROCESS CALIBRATOR

(71) Applicant: Beamex OY AB, Pietarsaari (FI)

(72) Inventors: Kari Autio, Pietarsaari (FI); Heikki Laurila, Pietarsaari (FI); Marko Stenbacka, Pietarsaari (FI)

(73) Assignee: Beamex OY AB, Pietarsaari (FI)

( * ) Notice: Subject to any disclaimer, the term of this patent is extended or adjusted under 35 U.S.C. 154(b) by 312 days.

(21) Appl. No.: 14/375,198

(22) PCT Filed: Feb. 8, 2013

(86) PCT No.: PCT/FI2013/050139
§ 371 (c)(1),
(2) Date: Jul. 29, 2014

(87) PCT Pub. No.: WO2013/117818
PCT Pub. Date: Aug. 15, 2013

(65) Prior Publication Data
US 2015/0026492 A1   Jan. 22, 2015

(30) Foreign Application Priority Data

Feb. 8, 2012  (FI) .................................. 20125137

(51) Int. Cl.
*G06F 1/26*  (2006.01)
*G05B 19/05* (2006.01)
(Continued)

(52) U.S. Cl.
CPC ......... *G06F 1/266* (2013.01); *G05B 19/0423* (2013.01); *G05B 19/0425* (2013.01);
(Continued)

(58) Field of Classification Search
CPC ..... G06F 1/266; G06F 13/10; G05B 19/0423; G05B 19/0425; G05B 19/054;
(Continued)

(56) References Cited

U.S. PATENT DOCUMENTS

| | | |
|---|---|---|
| 6,330,517 B1 | 12/2001 | Dobrowski et al. |
| 2002/0167904 A1 | 11/2002 | Borgeson et al. |

(Continued)

FOREIGN PATENT DOCUMENTS

WO    2006/133308    12/2006

OTHER PUBLICATIONS

Finnish Search Report for Finnish Application No. 20125137 dated Sep. 28, 2012.

(Continued)

*Primary Examiner* — Ji H Bae
(74) *Attorney, Agent, or Firm* — Andrus Intellectual Property Law, LLP

(57) ABSTRACT

A process calibrator is formed with functions of a fieldbus communicator. Preferably, functions of a fieldbus communicator support several fieldbus protocols, and it is provided such that the use of it does not hamper the functioning of a process calibrator. This has been achieved by providing the process calibrator with a pair of fieldbus connecting terminals for measuring of the fieldbus signal. The process calibrator comprises a processor, and the pair of fieldbus connecting terminals comprises a signal terminal and a ground terminal. The process calibrator further comprises at least two parallel fieldbus protocol units between the processor and the signal terminal of the pair of fieldbus connecting terminals. Each fieldbus protocol unit is dedicated to its respective fieldbus protocol. Further, the process calibrator comprises a selection unit for selecting a fieldbus protocol unit and a voltage unit for being between the terminals of said pair of fieldbus connecting terminals, which voltage unit is arranged to adjust the voltage and the impedance according to the selected fieldbus protocol unit. The selecting unit is controlled manually through the user interface. The user interface is realized by a touch screen or a (Continued)

combination of a touch screen and keyboard or only by a keyboard.

19 Claims, 4 Drawing Sheets

(51) Int. Cl.
    *G06F 13/10*      (2006.01)
    *G05B 19/042*      (2006.01)
    *G05B 19/409*      (2006.01)

(52) U.S. Cl.
    CPC ......... *G05B 19/054* (2013.01); *G05B 19/409* (2013.01); *G06F 13/10* (2013.01); *G05B 2219/1134* (2013.01); *G05B 2219/15028* (2013.01); *G05B 2219/23406* (2013.01); *G05B 2219/24028* (2013.01); *G05B 2219/25428* (2013.01); *G05B 2219/31129* (2013.01); *G05B 2219/31181* (2013.01); *G05B 2219/33331* (2013.01)

(58) Field of Classification Search
    CPC .......... G05B 19/409; G05B 2219/1134; G05B 2219/15028; G05B 2219/23406; G05B 2219/24028; G05B 2219/25428; G05B 2219/31129; G05B 2219/31181
    USPC ........................... 713/300; 702/85; 714/100
    See application file for complete search history.

(56) References Cited

U.S. PATENT DOCUMENTS

| | | |
|---|---|---|
| 2003/0236937 A1 | 12/2003 | Barros De Almeida et al. |
| 2004/0073402 A1 | 4/2004 | DelaCruz et al. |
| 2004/0230327 A1 | 11/2004 | Opheim et al. |
| 2008/0075012 A1 | 3/2008 | Zielinski et al. |
| 2008/0091376 A1 | 4/2008 | Russell et al. |

OTHER PUBLICATIONS

International Preliminary Report on Patentability for PCT/FI2013/050139 dated Jun. 4, 2014.

Response to Written Opinion for PCT/FI2013/050139 dated May 7, 2014.

Supplementary European Search Report for EP Patent Application No. 13746828.6, dated Dec. 8, 2015.

PROCESS CALIBRATOR

CROSS-REFERENCE TO RELATED APPLICATIONS

This application is the U.S. national stage application of International Application PCT/FI2013/050139, filed Feb. 8, 2013, which international application was published on Aug. 15, 2013, as International Publication WO2013/117818 in the English language. The international application is incorporated herein by reference, in entirety. The international application claims priority to Finnish Patent Application No. 20125137, which is incorporated herein by reference.

The invention relates to a process calibrator, which comprises a processor, an input unit for transmitting calibration signals and at least one pair of connecting terminals with a signal terminal and an ground terminal.

PRIOR ART

In industry, the same process and phase may include several process instruments. These are devices or converters that measure a variable and convert the measured value into another, usually electronic, form. An example of such is a pressure transducer which measures pressure and converts the measured value into one of the following forms: pressure, current signal, voltage signal, display, digital signal or something else. Also different controllers related to the process are process instruments.

Devices related to the process may be connected via a fieldbus. By a fieldbus such a usually digital communications solution is meant, whereby several fieldbus instruments are joined in the same fieldbus segment. A fieldbus instrument is a process instrument, which measures continuously or at some frequency a variable and converts the measured value into a form according to the fieldbus protocol. As an example serves a pressure transducer, if a pressure of 1.0000 bar is connected to its input, the output according to the fieldbus protocol of the sender needs to tell, that the input is 1.0000 bar.

FIG. 1 shows a fieldbus 102 related to an industrial process 101, with three fieldbus instruments: the first fieldbus instrument 103a, the second fieldbus instrument 103b and the third fieldbus instrument 103c.

Fieldbus instruments may include for example frequency converters, switches, valves and measuring devices. The basic idea in a fieldbus is digital data transmission, by which information can be exchanged bidirectionally between the control system of the process and the fieldbus instruments. By means of a fieldbus processes are measured and controlled and they can be automated. Advantages in use of fieldbuses are for example decreasing of wiring and connections, bi-directional data transmission and decreasing of maintenance costs. On the other hand, fieldbuses require special skills and management of large entireties from their operator. There are several different standards of fieldbuses and they use their own fieldbus protocols, respectively. A fieldbus communicator is used to communicate with the fieldbus instruments of a fieldbus. Therewith for example different settings of fieldbus instruments can be checked and changed. The fieldbus communicator has to support the fieldbus protocol of the used fieldbus. Generally a fieldbus communicator is manufactured to support one fieldbus protocol. Publication U.S. Pat. No. 7,117,122 discloses a device for diagnosis of a fieldbus with features of a fieldbus communicator. The device can be operated with two different fieldbus protocols by changing terminals.

Usually, process instruments need to be calibrated or checked regularly for proper operation and proper and accurate conversion of signal. Thereby an accurate signal of correct variable is fed into the input, and at the output of the device the signal is read which is indicated by the transmitter as the input. By comparing these two it can be confirmed whether the transmitter is working correctly, that is whether it converts the output into input in a correct way. For that reason process calibrators are used that are measuring devices that are accurate enough, so that they can be used for calibrating process instruments. Usually, process calibrators support such variables that are used by the most typical process instruments, that is, for example, pressure, voltage, current, temperature, frequency and the like.

From patent publication U.S. Pat. No. 6,571,188 is known a process calibrator of prior art described above. Here, a known process signal or calibration signal is fed to the process instrument and the result is saved in the memory of the calibrator.

FIG. 2 shows an example of calibration of fieldbus instruments of the fieldbus 102 shown in FIG. 1. The figure shows the third fieldbus instrument 103c being calibrated. The calibration is performed with a process calibrator 201. The process calibrator feeds a known signal to the third fieldbus instrument with the signal unit 203 and reads an analog signal with output unit 202. Fieldbus instruments according to the HART fieldbus protocol comprise an analog current output which varies between 4-20 mA. A HART fieldbus protocol further includes digital communication. A process calibrator according to U.S. Pat. No. 6,571,188 operates like this. HART fieldbus protocol is the most common fieldbus protocol used in industry. If some other fieldbus protocol is used, such as FOUNDATION Fieldbus or Profibus protocols, where communication is only digital, the output of the fieldbus is to be read in the fieldbus. Thereby the process calibrator feeds a known signal to the fieldbus instrument, and the output of the fieldbus instrument can be read by the fieldbus communicator 204.

By metrological verification it is verified that the measuring devices correspond to the requirements of the intended use. Metrological verification usually includes calibration or comparison, necessary regulation or correction, recalibration after those, and possibly the necessary markings of the measuring device. Thus, this cannot be done only with the process calibrator, but also other devices are necessary. This slows down the calibration. Furthermore, process calibrators are complicated devices that require training and expertise from their user.

SUMMARY

The object of the invention is a solution, by which the disadvantages and drawbacks of the prior art can be diminished. Particularly, the object of the invention is a solution, by which metrological calibration could be performed only with a process calibrator.

The objects according to the invention are achieved by a process calibrator, characterized in what is disclosed in the independent claim. Some preferred embodiments of the invention are disclosed in the dependent claims.

The leading idea of the invention is to form a process calibrator with functions of a fieldbus communicator. Preferably, functions of a fieldbus communicator support several fieldbus protocols, and it is provided such that the use of it does not hamper the functioning of a process calibrator. This has been achieved by providing the process calibrator with one pair of connecting terminals for measuring of the fieldbus signal.

According to one embodiment of the invention, the process calibrator comprises a processor, an input unit for transmitting calibration signals and at least one pair of connecting terminals with a signal terminal and a ground terminal. According to one preferred embodiment of the invention, at least one pair of connecting terminals of the said pairs of connecting terminals is a pair of fieldbus connecting terminals for measuring of the fieldbus signal. The process calibrator further comprises at least two parallel fieldbus protocol units between the processor and the signal terminal of the pair of fieldbus connecting terminals. Each fieldbus protocol unit is assigned to its respective fieldbus protocol. Further, the process calibrator comprises a selection unit for selecting a fieldbus protocol unit and a voltage unit for being between the terminals of said pair of fieldbus connecting terminals, which voltage unit is arranged to adjust the voltage between said terminals and the impedance according to the selected fieldbus protocol unit.

In an embodiment of the process calibrator according to the invention, the process calibrator comprises a communication unit for communication with the fieldbus instruments of the fieldbus, and the communication is arranged to be performed via the pair of fieldbus connecting terminals. Especially, the communication is performed by the same pair of fieldbus connecting terminals as the signal of the fieldbus is measured with. In another embodiment of the process calibrator according to the invention, the communication unit is a part of the fieldbus protocol unit.

In a third embodiment of the process calibrator according to the invention, the process calibrator comprises a display, which is arranged to simultaneously show the process calibrator signal and the fieldbus signal.

In a fourth embodiment of the process calibrator according to the invention, the process calibrator comprises input means for controlling the process calibrator. In a fifth embodiment of the process calibrator according to the invention the input means is a touch screen. In a sixth embodiment of the process calibrator according to the invention the touch screen is arranged to represent a user interface.

In a seventh embodiment of the process calibrator according to the invention, the voltage unit is arranged to adjust the impedance with an adjustable resistor.

In an eighth embodiment of the process calibrator according to the invention there is an arrangement for measuring the current going between the terminals of the pair of fieldbus connecting terminals.

In a ninth embodiment of the process calibrator according to the invention, the process calibrator is portable. In a tenth embodiment of the process calibrator according to the invention, the process calibrator is fixedly mountable.

In a eleventh embodiment of the process calibrator according to the invention, the components and the connections of the process calibrator are adapted to potentially explosive atmospheres, i.e. the connections are arranged such that they are applicable in possibly explosive atmospheres.

In a twelfth embodiment of the process calibrator according to the invention, the selecting unit for selecting the fieldbus protocol unit is arranged to be used manually. Thereby the operator of the process calibrator selects by means of the user interface the fieldbus protocol unit to be used. The selecting unit sees to it that only the selected fieldbus protocol unit is active.

In a thirteenth embodiment of the process calibrator according to the invention, there are three fieldbus protocol units, and the fieldbus protocols supported by them are HART, FOUNDATION Fieldbus and Profibus.

In a fourteenth embodiment of the process calibrator according to the invention, the input unit is one or more pairs of connecting terminals or a corresponding connector for feeding a calibration signal, one or more of which can be arranged to be used at the same time with the pair of fieldbus connector terminals.

In a fifteenth embodiment of the process calibrator according to the invention, the process calibrator comprises a memory and device description files of fieldbus instruments can be stored in the memory.

An advantage of the invention is that by means of it a process calibrator is provided, by means of which calibration is facilitated, because the amount of devices needed decreases. Thereby the calibration also is accelerated and performing it becomes clearer, whereby the amount of mistakes decreases.

An advantage of the invention is that by means of it metrological calibration can be performed.

An advantage of the invention is further that it enables automatic calibrations and further the documentation of the results automatically with one device.

The invention further enables use of a process calibrator in several different types of fieldbuses.

DESCRIPTION OF THE FIGURES

In the following, the invention will be described in detail. In the description, reference is made to the enclosed drawings, in which.

DETAILED DESCRIPTION OF FIGURES

Figure 1:
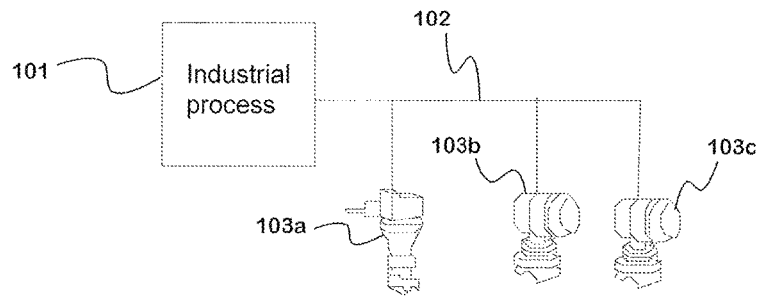
FIG. 1 shows by way of example a fieldbus.
Figure 2:
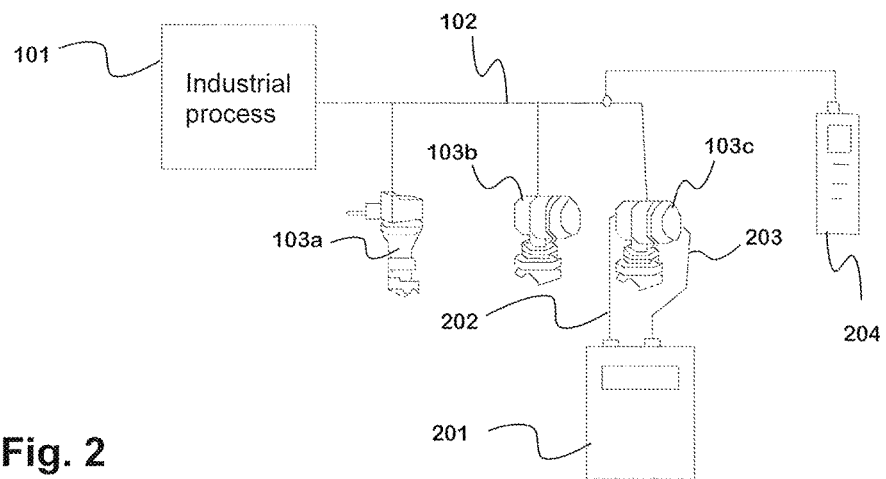
FIG. 2 shows by way of example a fieldbus and a process instrument in a fieldbus with a process calibrator connected thereto

FIGS. 1 and 2 are shown in connection of the prior art.

Figure 3:
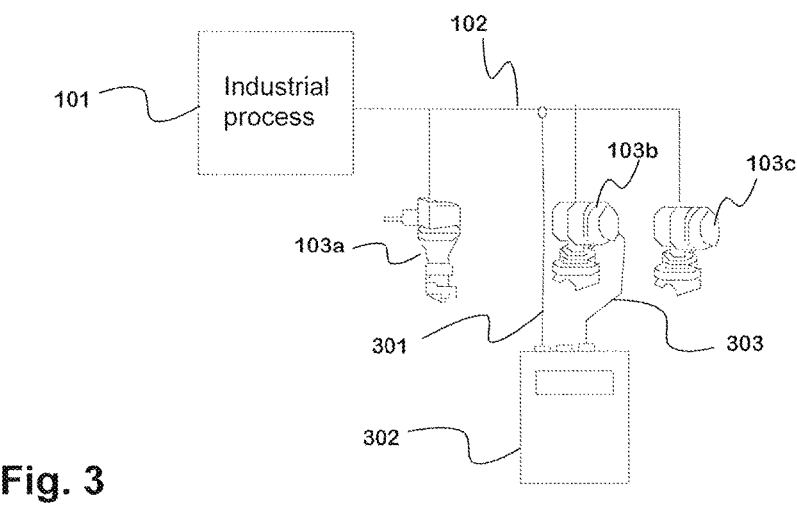
FIG. 3 shows by way of example a fieldbus and a process calibrator according to the invention.

FIG. 3 shows an example of the use of a process calibrator 302 according to the invention in calibration of fieldbus instruments. The process calibrator according to the invention comprises an input unit 303 and a unit 301 for communicating with the fieldbus 102. The input unit 303 is connected to the input of the second fieldbus instrument 103*b* for feeding a known signal. The process calibrator reads the output of the second fieldbus instrument in the fieldbus. When necessary, the settings of the second fieldbus instrument can also be changed via the unit 301.

Figure 4:
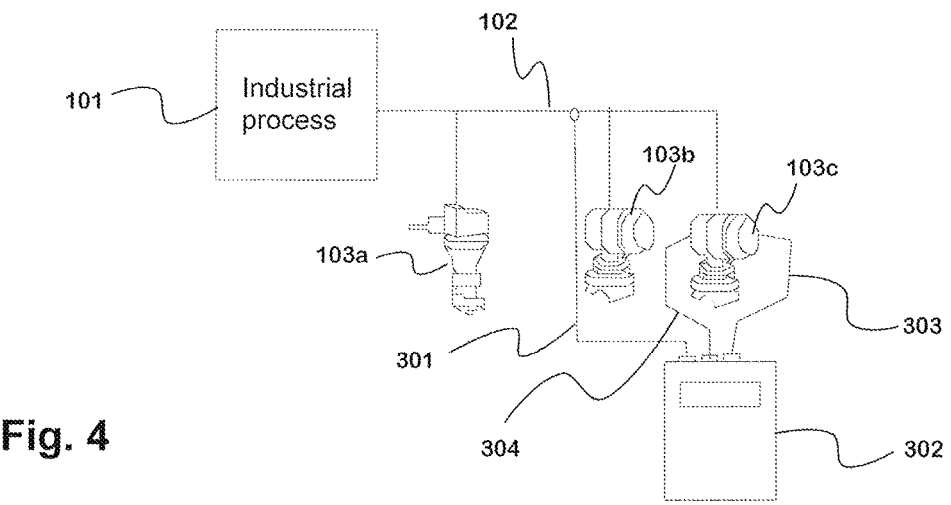
FIG. 4 shows another example of the fieldbus of FIG. 3 and of a connection of the process calibrator according to the invention.

FIG. 4 shows a second example of the use of a process calibrator 302 according to the invention in calibration of fieldbus instruments. The process calibrator further comprises a unit 304 for reading of analog signal. The third fieldbus instrument 103*c* is calibrated by feeding a known signal to the third fieldbus instrument via the input unit 303 and by reading an analog signal with the unit 304. The output signal of the fieldbus instrument can further be read in the fieldbus with the unit 301. Furthermore, to communicate with the fieldbus 102 by means of said unit the settings of the fieldbus instrument can be checked and, when necessary, changed.

Figure 5:
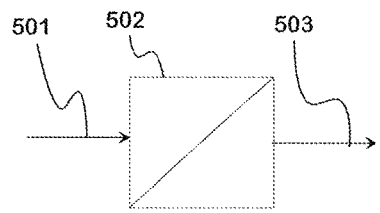
FIG. 5 shows an example of a fieldbus instrument.

FIG. 5 shows a simplified example of the fieldbus instrument 502. The fieldbus instrument comprises an input signal 501 and an output signal 503. The input signal is a process variable, such as for example pressure, temperature, voltage, current, pulse, frequency or a similar variable. The output signal is a digital signal according to the fieldbus protocol in use. In case of a HART protocol, in the output there are both a digital signal and an analog current signal of 4-20 mA at the same time.

Figure 6:
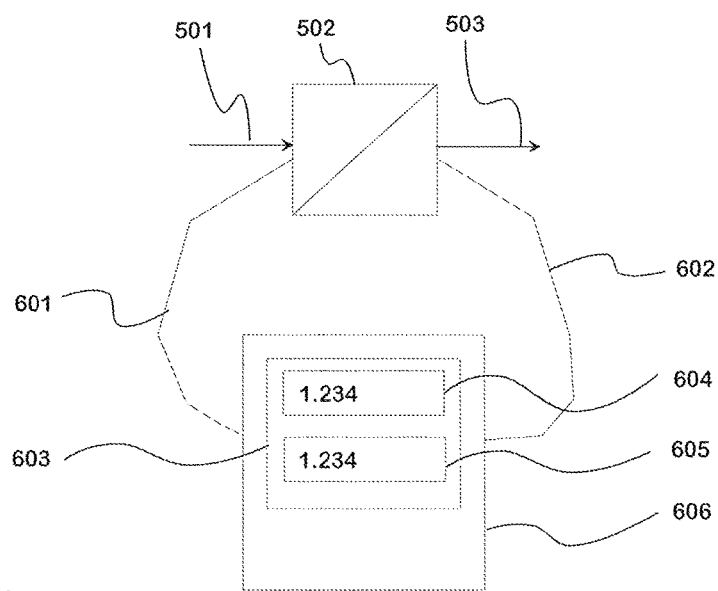
FIG. 6 shows an example of the use of a process calibrator according to the invention for calibration of a fieldbus instrument.

In FIG. 6, a fieldbus instrument 502 shown in FIG. 5 is being calibrated with a process calibrator 606 according to the invention. The process calibrator comprises a signal unit 601 for feeding a known signal to the fieldbus instrument as an input signal 501, and an output unit 602 for reading a digital signal according to the fieldbus protocol. The process calibrator comprises a display 603, which is provided for showing simultaneously a known signal 604 fed to the fieldbus instrument and the output signal 605 of the fieldbus instrument read in the fieldbus. Simultaneous display of said signals enables quick comparison thereof.

Calibration of fieldbus instruments according to FIGS. 3, 4 and 6 cannot have been performed with process calibrators of the prior art, but in addition to the process calibrator also other devices or arrangements have been necessary, such as fieldbus-instrument-specific stationary measuring instruments or portable accessories.

Figure 7:
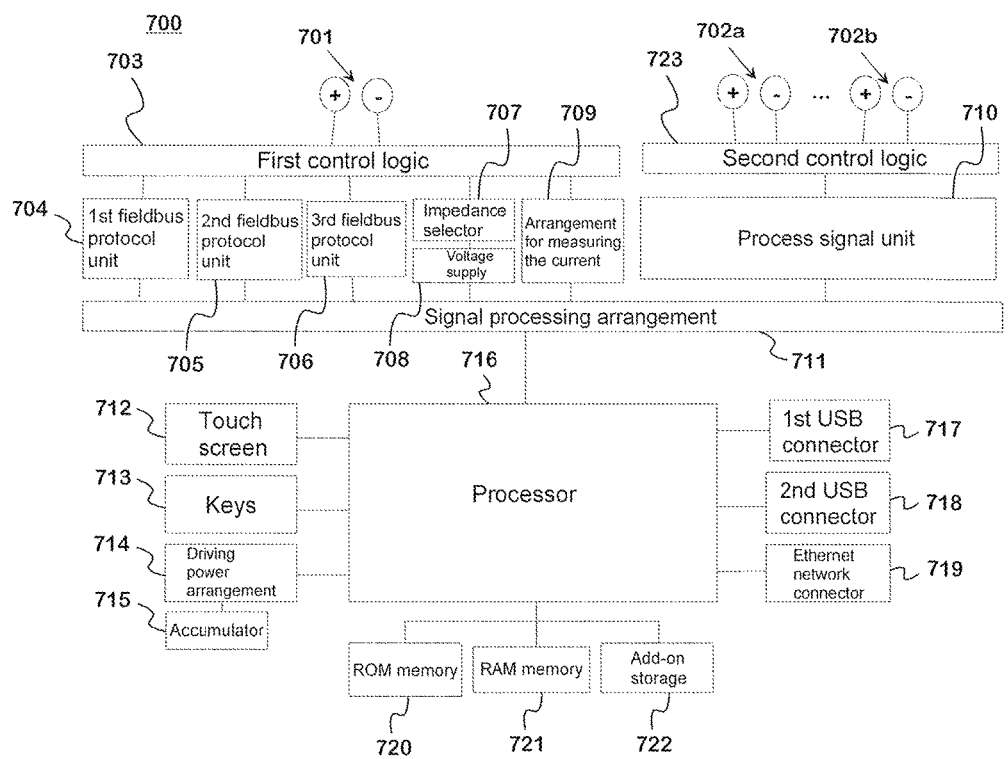
FIG. 7 shows an example of a process calibrator according to the invention shown as functional blocks and FIG. 8 shows a simplified example of a part of a process calibrator according to the invention.

FIG. 7 shows an example of a process calibrator 700 according to the invention shown as functional blocks.

The process calibrator 700 according to the example comprises a pair of connecting terminals 701 with a signal terminal and a ground terminal. Said pair of connecting terminals is a pair of fieldbus connecting terminals for measuring the signal of the fieldbus. Furthermore, the process calibrator comprises a first pair of connecting terminals 702*a* and a second pair of connecting terminals 702*b* for transmitting calibration signals. Naturally, there may exist more connection arrangements and they may be of other kind than pairs of connection terminals. Further, the process calibrator may comprise more inputs for reading different signals, but they are not shown in this example. A pair of fieldbus connecting terminals can also be used for transmitting control signals to a fieldbus instrument in a fieldbus. Thereby a process calibrator can communicate with fieldbus instruments.

The process calibrator 700 according to the invention is one unit, where all necessary components are integrated in one device.

The process calibrator 700 comprises a first control logic 703 and a second control logic 723 to function as a selecting unit. The first control logic controls the functioning of the pair of fieldbus connecting terminals. The second control logic controls the calibrating signals and the selection of the pairs of connection terminals and the process signal unit 710. The process signal unit comprises arrangements for producing different signals, which include at least calibration signals. The control logics may also be joined together.

The process calibrator 700 according to the example comprises three fieldbus protocol units: a first fieldbus protocol unit 704, a second fieldbus protocol unit 705 and a third fieldbus protocol unit 706. Each fieldbus protocol unit is dedicated to its respective fieldbus protocol. The first control logic 703 selects the active one of the fieldbus protocol units, i.e. which fieldbus protocol is used by the process calibrator. The control logic is controlled manually by the user interface. Since the fieldbus protocols are different, a communication unit (not shown in the figure) is needed for the communication with the fieldbus and the fieldbus instruments therein, which communication unit sees to it that the communication corresponds to the protocol used. There may be several communication units, i.e. one for each protocol, and each communication unit is in a respective fieldbus protocol unit or in connection with it.

The process calibrator 700 comprises a voltage supply 708, by which a desired supply voltage can be provided between the terminals of the pair of connection terminals 701, which input voltage corresponds to the fieldbus protocol.

The fieldbus protocols require a suitable impedance for the supply voltage, in order to enable the communication. This impedance is regulated by the impedance selector 707. The impedance selector may be an adjustable resistor or a similar arrangement.

Said voltage supply 708 and impedance selector 707 are controlled by the first control logic 703. The voltage supply and the impedance selector form together a voltage unit. The supply voltage travels through the impedance selector 707, where the desired impedance is selected for the input voltage under the control of the user interface. The selecting logic chooses whether the supply voltage is connected and with which impedance, or without impedance, i.e. with a low impedance.

The process calibrator comprises an arrangement 709 for measuring of the current going via the terminals of the pair of fieldbus connecting terminals. The current measuring is connected simultaneously with the fieldbus communication to the same fieldbus connectors. The current measuring is necessary especially with the HART protocol, in order to be able to measure the current signal simultaneously with the HART communication.

The process calibrator 700 comprises a processor 716 which controls the operation of the process calibrator. Signals coming to the processor travel via the signal processing arrangement 711. Hereby the signals are converted to a form understood by the processor. The process calibrator further comprises a touch screen 712 and keys 713, which function as the input means. The process calibrator may also be realized with a regular display or with a touch screen without the keyboard. The user interface of a process calibrator is displayed on a touch screen.

The process calibrator comprises a driving power arrangement 714 which provides the driving power of the process calibrator. The driving power arrangement may comprise an accumulator 715, but also other energy sources can be used, such as batteries or fuel cells. The process calibrator can also be connected to an external source of energy, such as, for example, to mains current. This can be done, for example, if the process calibrator is mounted in a fixed manner.

The process calibrator may comprise connectors for data transmission. In a case according to the example, the process calibrator comprises a first 717 and a second USB connector 718 and an Ethernet network connector 719. Naturally, there may be other connectors as well and the amount of them may vary.

The process calibrator of FIG. 7 comprises a ROM memory 720, a RAM memory 721 and an add-on storage 722. The instructions and information needed by the process calibrator for its functioning are stored in the ROM memory 720. The RAM memory 721 is used to store for example temporary files such as measuring results and similar. The add-on storage may be fixedly mountable, for example at the factory or the distributor, and it contains files that determine functioning of the process calibrator. These files may comprise device description files. To communicate with the fieldbus instrument, usually a device description file is needed, by means of which the fieldbus communicator supports different fieldbus instruments. New or updated device description files can be added to the add-on storage via the data transmission connectors described above. The add-on storage may also be replaceable.

Figure 8:
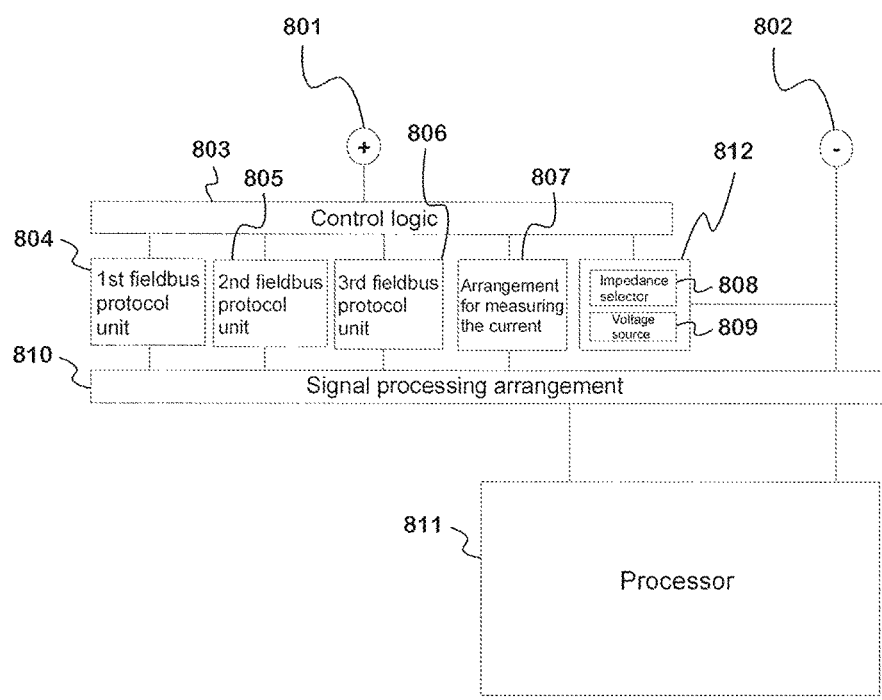

In FIG. 8 a part of the process calibrator according to the invention is described in more detail, by which a part the fieldbus communicator functions can be realized.

A process calibrator according to the example comprises a signal terminal 801 and a ground terminal 802, which form a pair of fieldbus connecting terminals that is connectable to the fieldbus. The pair of fieldbus connecting terminals exists for reading of the fieldbus signal. Via the pair of fieldbus connection terminals also communication with the fieldbus instruments in the fieldbus can be arranged. By communication is meant that a message, an instruction or similar can be sent to the fieldbus instrument for controlling or changing its operation. For example, in connection with the calibration the fieldbus instrument can be controlled in order to achieve a certain output corresponding to a certain calibration signal.

The process calibrator comprises a control logic 803, which controls the functioning of the pair of fieldbus connecting terminals, i.e. it functions as a selecting unit. The control logic is connected at least to the signal terminal 801. The process calibrator comprises a processor 811. Signals coming to the processor travel via the signal processing arrangement 810. Hereby the signals are converted to a form understood by the processor. Furthermore, the signal processing arrangement can function as a safety unit by preventing access of voltage spikes or currents to the processor that are harmful to the processor. This can be attended to also by another arrangement, such as fuses or relays. The signal processing arrangement is connected at least to be between the signal terminal 801 and the processor.

The process calibrator according to the example comprises three fieldbus protocol units: a first fieldbus protocol unit 804, a second fieldbus protocol unit 805 and a third fieldbus protocol unit 806. Each fieldbus protocol unit is dedicated to its respective fieldbus protocol. In this example, the first fieldbus protocol unit supports the HART protocol, the second fieldbus protocol unit supports the FOUNDATION Fieldbus protocol, and the third fieldbus protocol unit supports the Profibus protocol. Control logic 803 selects which one of the fieldbus protocol units is active, i.e. which fieldbus protocol is used by the process calibrator. For communicating with the fieldbus and the fieldbus instruments therein a communication unit is needed, which is described in connection with FIG. 7. The control logic is controlled via the user interface, i.e. the fieldbus protocol to be used is selected in the user interface.

The process calibrator comprises a current measuring arrangement 807 for measuring of the current going via the terminals of the pair of fieldbus connecting terminals. One way for arranging this is to conduct the current from the signal terminal via an in-device resistor unit to the earth terminal, and the current can be calculated by measuring the voltage over the resistor unit. This is useful especially with the HART protocol. Measuring of the current is performed in the milliampere range. Preferably, it is delimited on the current range of 4-20 mA used by the HART protocol.

The process calibrator comprises a voltage unit 812. This comprises an impedance selector 808 and a voltage source 809. The voltage source is connected to be between the signal terminal 801 and the earth terminal 802. The fieldbus instruments are mostly two-wire transmitters, i.e. they receive the necessary operating voltage through the same connections, through which they also communicate. The process calibrator may either feed the supply voltage necessary for the fieldbus instrument by itself at the same time as it communicates, or the input voltage may come from outside and the device only communicates with the fieldbus instrument. The supply voltage is usually ca. 24 VDC, but it may typically vary between ca. 9-32 VDC. The supply voltage can be adjusted to correspond to the used fieldbus protocol by the voltage source.

Impedances differ depending on the communication protocol. The HART protocol typically requires an impedance of ca. 250 ohm, whereas the FOUNDATION Fieldbus and Profibus protocols require an impedance of ca. 50 ohm. Impedance is converted to correspond to the communication protocol by the impedance selector 808.

The control unit 803 controls the voltage unit 812 with the user interface according to the selected communication protocol to be used. Thereby the voltage unit adjusts the voltage and the impedance to correspond to the communication protocol.

The arrangement shown in FIG. 8 enables the use of fieldbus communicator properties in a process calibrator.

Above, some preferred embodiments according to the invention have been described. The invention is not limited to the solutions described above, but the inventive idea can be applied in numerous ways within the scope of the claims.

The invention claimed is:

1. A process calibrator, comprising:
    a processor;
    a first pair of fieldbus connecting terminals, comprising a signal terminal and a ground terminal, said pair of fieldbus connecting terminals operable to measure the digital signal of a fieldbus;
    a second pair of fieldbus connecting terminals for reading an analog signal from a fieldbus instrument;
    a first control circuit that operates to select a fieldbus protocol out of at least two fieldbus protocols;
    a voltage unit comprised of a voltage supply and an impedance selector connected between the terminals of said first pair of fieldbus connecting terminals, which voltage unit operates to adjust the voltage between said terminals and the impedance according to the selected fieldbus protocol; and
    a display, operated by the processor, to show the signal of the process calibrator signal and the fieldbus instrument output signal simultaneously, said fieldbus instrument output signal being analog or digital.

2. The process calibrator according to claim 1, wherein at least one of the first and second pair of connecting terminals operate to communicate with the fieldbus instrument of the fieldbus.

3. The process calibrator according to claim 1, comprising input means for controlling the process calibrator.

4. The process calibrator according to claim 3, wherein the input means is a touch screen.

5. The process calibrator according to claim 4, wherein the touch screen is arranged to show a user interface.

6. The process calibrator according to claim 1, wherein the voltage unit is arranged to adjust the impedance with an adjustable resistor.

7. The process calibrator according to claim 1, comprising a current measuring arrangement connected to the first pair of fieldbus connecting terminals, which current measuring arrangement measures the current going through the first pair of fieldbus connecting terminals.

8. The process calibrator according to claim 1, wherein the at least two fieldbus protocols are three fieldbus protocols, comprising HART, FOUNDATION Fieldbus, and Profibus fieldbus protocols.

9. The process calibrator according to claim 1, wherein the process calibrator comprises one or more pairs of connecting terminals or a corresponding connector for feeding a calibration signal, one or more of which can be arranged to be used at the same time with the first pair of fieldbus connecting terminals.

10. The process calibrator according to claim 1, wherein the process calibrator comprises a memory and device description files can be stored in the memory.

11. A process calibrator for calibration of a process instrument connected to a fieldbus, the process calibrator comprising:
a pair of connecting terminals, comprising a signal terminal connected to the fieldbus and a ground terminal connected to ground;
a first control circuit that receives an input and selects an active fieldbus protocol from a plurality of fieldbus protocols;
a voltage supply and an impedance selector connected between the signal terminal and the ground terminal and provide an input signal to the signal terminal, wherein the voltage supply provides a supply voltage and the impedance selector operates to provide an impedance to the supply voltage between the voltage supply and the signal terminal; and
a display operated by a processor to visually present a numerical value representative of the input signal and to visually present a numerical value representative of an output signal of the fieldbus instrument received by the fieldbus connecting terminals in response to the input signal.

12. The process calibrator of claim 11, wherein the display further provides a user interface through which the input of a selected fieldbus protocol is received.

13. The process calibrator of claim 12, wherein the display is a touchscreen display.

14. The process calibrator of claim 11, wherein the voltage supply and the impedance selector are operated by the first control circuit according to the selected active fieldbus protocol.

15. The process calibrator of claim 11, wherein the active fieldbus protocol is selected from HART, FOUNDATION Fieldbus, and Profibus fieldbus protocols.

16. The process calibrator of claim 11, further comprising an ammeter connected to the fieldbus connecting terminals, the ammeter measures a current of the fieldbus.

17. The process calibrator of claim 11, further comprising:
a plurality of pairs of connecting terminals, including the pair of connecting terminals; and
a second control circuit connected between the plurality of pairs of connecting terminals, wherein the second control circuit operates to select the pair of connecting terminals from the plurality of pairs of connecting terminals.

18. The process calibrator of claim 17, wherein the second control circuit provides a calibration signal to the process instrument through the pair of connecting terminals selected by the second control circuit.

19. The process calibrator of claim 11, wherein the second control circuit further operates the pair of connecting terminals to provide calibrating signals to the process instrument connected to the pair of connecting terminals.

* * * * *